(12) United States Patent
Cook

(10) Patent No.: US 6,919,988 B2
(45) Date of Patent: Jul. 19, 2005

(54) OPTICAL SYSTEM FOR SIMULTANEOUS IMAGING OF LWIR AND MILLIMETER WAVE RADIATION

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/139,943

(22) Filed: May 6, 2002

(65) Prior Publication Data

US 2003/0206338 A1 Nov. 6, 2003

(51) Int. Cl.[7] .............................................. G02B 13/14
(52) U.S. Cl. ..................................... 359/356; 359/350
(58) Field of Search ............................... 359/350, 356, 359/366, 857

(56) References Cited

U.S. PATENT DOCUMENTS

| | | | | |
|---|---|---|---|---|
| 3,649,934 A | * | 3/1972 | Matthaei et al. ............ | 333/202 |
| 5,114,238 A | * | 5/1992 | Sigler .......................... | 359/399 |
| 5,303,001 A | * | 4/1994 | Jeong et al. ................. | 355/353 |
| 5,969,860 A | * | 10/1999 | Mearns ........................ | 359/432 |
| 6,434,088 B1 | * | 8/2002 | Ishizaki et al. .......... | 369/13.33 |
| 2002/0136144 A1 | * | 9/2002 | Hatano .................. | 369/112.23 |
| 2003/0021024 A1 | * | 1/2003 | Paramythioti ............... | 359/434 |

* cited by examiner

Primary Examiner—Drew A. Dunn
Assistant Examiner—Joshua L. Pritchett
(74) Attorney, Agent, or Firm—John E. Gunther; Leonard A. Alkov; Karl A. Vick

(57) ABSTRACT

A system and method for simultaneous imaging of both infrared and millimeter wave radiation. The novel optical system (10) includes a primary mirror (20), a Mangin secondary mirror (30) positioned to receive energy reflected from the primary mirror (20), and an immersion lens (40) for focusing energy received from the Mangin mirror (30). In the illustrative embodiment, the primary mirror (20) and Mangin mirror (30) are arranged in a Cassegrain configuration. Central to this invention is the use of a negative power refractive Mangin mirror (30) as the Cassegrain secondary mirror, so that the field curvature of the secondary mirror (30) and immersion lens (40) can be made to cancel. The immersion lens (40) effectively decreases the wavelength of the millimeter wave radiation, allowing a smaller detector to collect the same amount of radiation as would a larger detector in air. In the illustrative embodiment, the system (10) further includes a detector array (52) placed in intimate contact with the immersion lens (40).

17 Claims, 2 Drawing Sheets

100
OPTICAL SYSTEM FOR SIMULTANEOUS IMAGING OF LWIR AND MILLIMETER WAVE RADIATION

BACKGROUND OF THE INVENTION

1. Field of the Invention

The present invention relates to imaging systems. More specifically, the present invention relates to systems and methods for simultaneous imaging of infrared and millimeter wave radiation.

2. Description of the Related Art

Imaging systems are employed in a variety of demanding applications including security surveillance, aircraft landing, missile guidance, target detection and classification, terrain mapping, and mine detection applications. Such applications require cost-effective, space-efficient, and reliable imaging systems that can provide effective images at night and in adverse weather conditions.

Infrared, and millimeter wave imaging systems are exemplary electromagnetic imaging systems in current use. Infrared imaging systems detect thermal energy radiating from an object. These systems, however, typically require favorable weather conditions to produce effective mission-enabling images. Rain, fog, or smoke may block infrared electromagnetic energy.

On the other hand, millimeter wave energy passes through rain, fog, and smoke with little attenuation. Consequently, millimeter wave imaging systems are generally less sensitive to weather obstructions than their infrared counterparts.

However millimeter wave systems typically generate images with relatively poor resolution compared to infrared systems. Therefore, infrared systems are generally preferred during favorable weather conditions.

Thus, for many applications, it would be desirable to have the capability to sense in the millimeter wave range or the infrared range or both.

Currently, no system is available which is capable of imaging in response to both infrared and millimeter wave radiation. In order to sense in both frequency bands, two separate systems would be required using conventional teachings: a stand-alone millimeter wave system and a stand-alone infrared system. However, this approach would be costly and impractical for most applications.

Hence, a need exists in the art for an inexpensive yet effective system and method for simultaneous imaging in both infrared and millimeter wave ranges.

SUMMARY OF THE INVENTION

The need in the art is addressed by the system and method for simultaneous imaging of both infrared and millimeter wave radiation of the present invention. The novel optical system includes a primary mirror, a Mangin secondary mirror positioned to receive energy reflected from the primary mirror, and an immersion lens for focusing energy received from the Mangin mirror. In the illustrative embodiment, the primary mirror and Mangin mirror are arranged in a Cassegrain configuration. Central to this invention is the use of a negative power refractive Mangin mirror as the Cassegrain secondary mirror, so that the field curvature of the secondary mirror and immersion lens can be made to cancel. The immersion lens effectively decreases the wavelength of the millimeter wave radiation, allowing a smaller detector to collect the same amount of radiation as would a larger detector in air. In the illustrative embodiment, the system further includes a detector array placed in intimate contact with the immersion lens.

BRIEF DESCRIPTION OF THE DRAWINGS

FIG. 1b shows a ray trace section of the optical system of FIG. 1a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
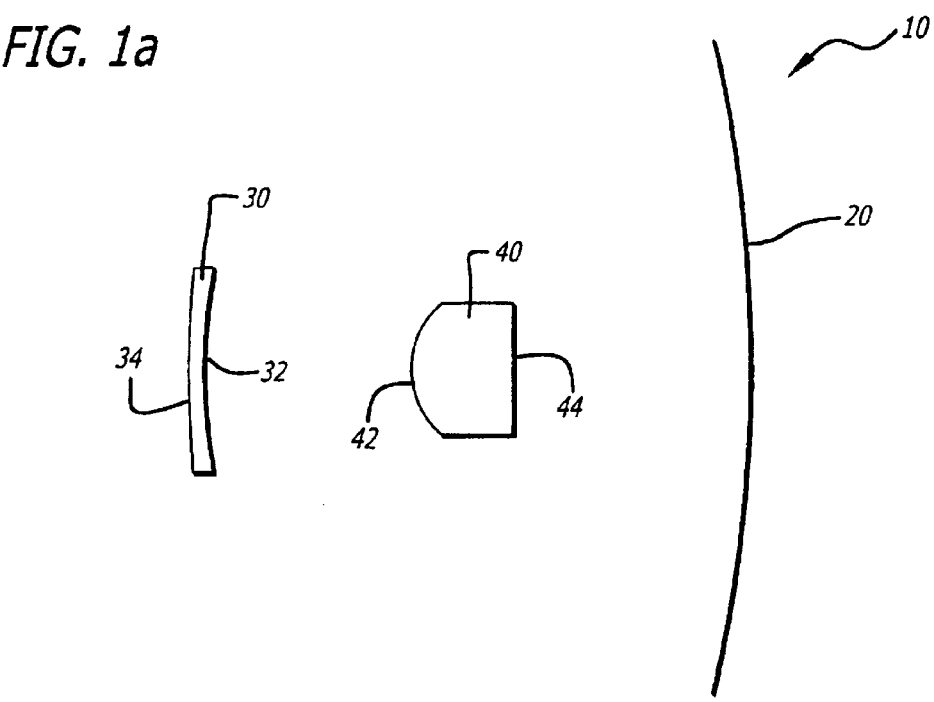
FIG. 1a is an optical schematic of an illustrative embodiment of the optical system of the present invention.
Figure 1B:
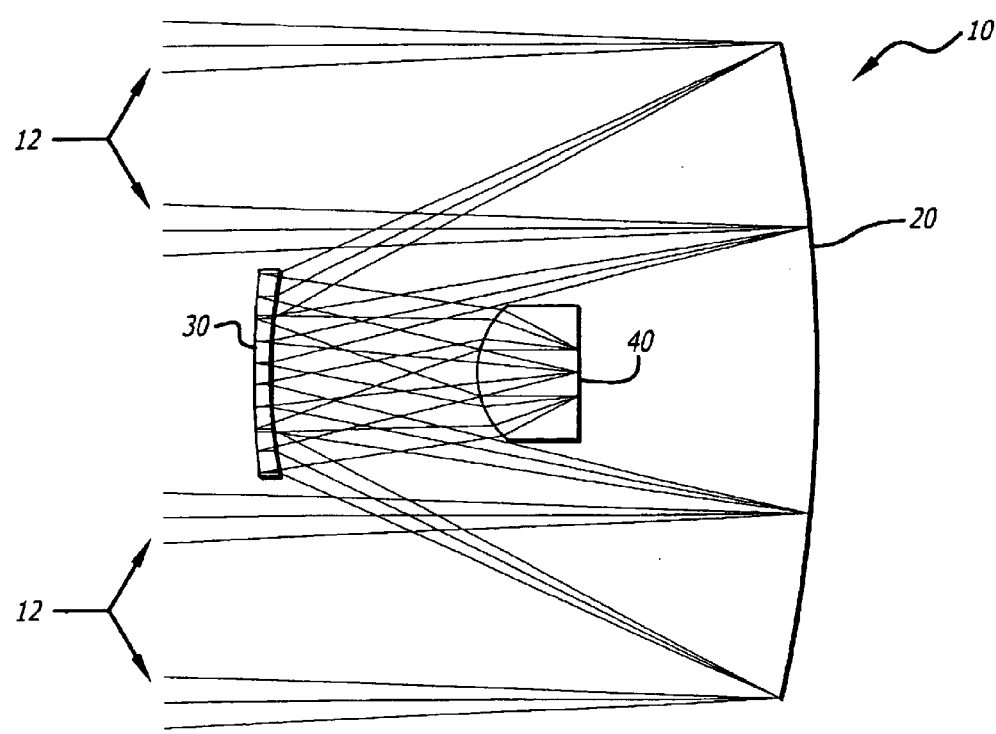

The present invention is a catadioptic (meaning using both mirrors and lenses) optical system resembling a Cassegrain configuration that is specially designed to accommodate both infrared and millimeter wave radiation. FIG. 1a is an optical schematic of an illustrative embodiment of the optical system 10 of the present invention. FIG. 1b shows a ray trace section of the optical system 10 of FIG. 1a. In the illustrative embodiment, the optical system 10 is designed to image long wavelength infrared (LWIR) and millimeter wave (MMW) radiation. The system 10 includes three optical elements: a primary mirror 20, a secondary mirror 30, and an immersion lens 40. Incident energy 12 reflects off of the primary mirror 20 towards the secondary mirror 30. The secondary mirror 30 is positioned to receive energy reflected from the primary mirror 20 and reflect it towards the immersion lens 40.

In general, a Cassegrain configuration is an optical system composed of two mirrors, wherein the primary mirror 20 is larger than the secondary mirror 30 and has positive power, and the secondary mirror 30 has negative power and is centrally located relative to the primary 20. These two mirrors act in conjunction to create an image in the focal plane of the optical system. The Cassegrain configuration has an advantageous property in that the focal length of the two mirrors working in conjunction is considerably longer than the separation between the two mirrors.

The primary mirror 20 can be any reflecting surface of conventional design and construction capable of reflecting radiation at the desired wavelengths (LWIR and MMW in the illustrative embodiment). For instance, a metal coating (such as gold, aluminum, or silver) applied to any kind of substrate would be suitable. Incident energy 12 reflects off of the primary mirror 20 and converges towards the secondary mirror 30.

Central to the unique character of the present invention is the use of a negative power Mangin mirror as the secondary mirror 30. A Mangin mirror is an optical element with a refractive first surface 32 and a reflective rear surface 34. It is composed of a layer of refractive material (such as zinc selenide or zinc sulfide) capable of transmitting radiation at the desired wavelengths (LWIR and MMW in the illustrative embodiment) with a reflective coating applied to the rear surface 34. The reflective coating can be of any material (such as gold, aluminum, or silver) which can reflect the desired wavelengths. An anti-reflection coating which operates with high efficiency at the desired wavelengths should be applied to the first surface 32.

Energy from the primary mirror 20 passes through the refractive material of the Mangin mirror 30, reflects off of the reflective rear surface 34, and makes a second pass through the refractive material. The negative power of the Mangin mirror 30 reduces the rate of convergence of the energy received. The energy output from the Mangin mirror converges towards the immersion lens 40.

Figure 2:
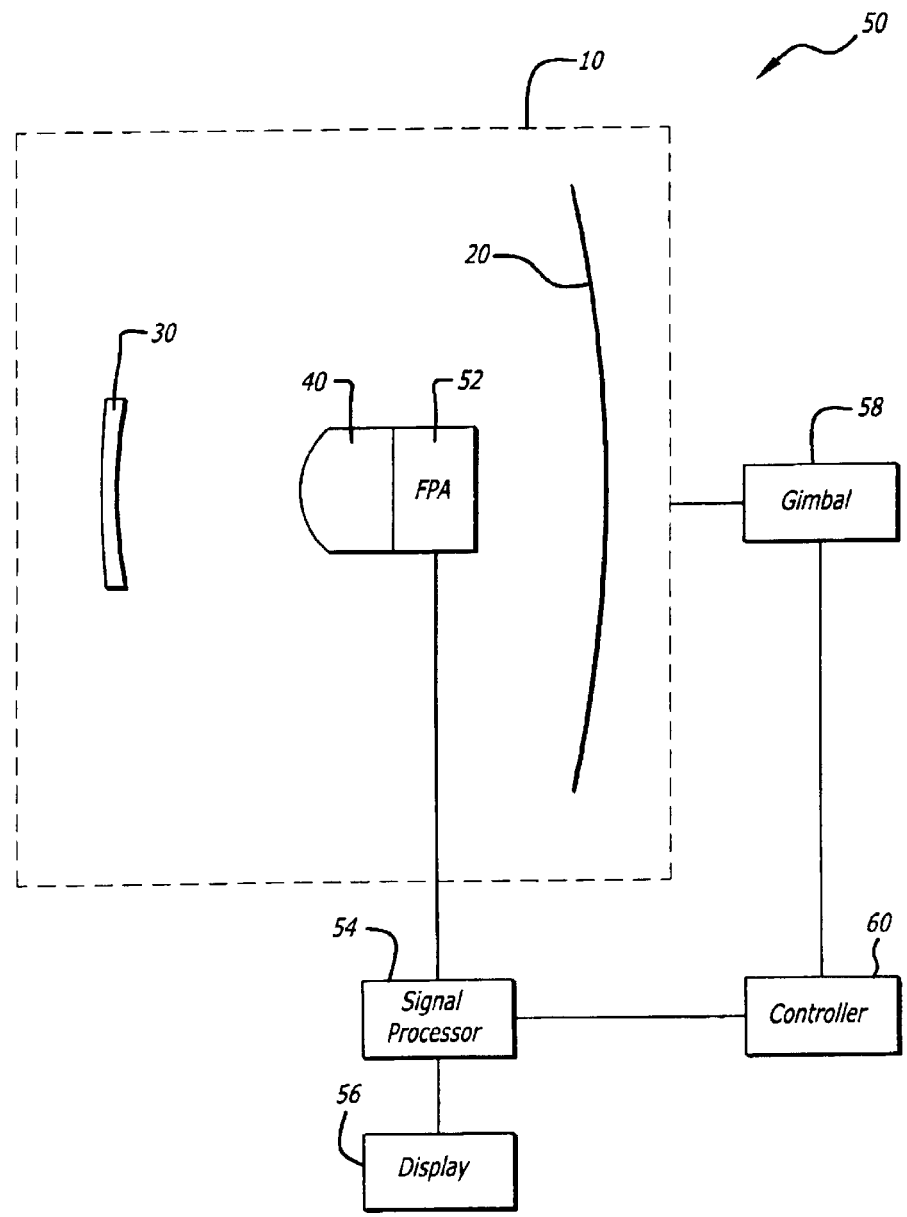
FIG. 2 is a block diagram of an imaging system designed in accordance with the teachings of the present invention.

Central to the present invention is the need for an immersion lens 40 immediately attached to the focal plane. As is known in the art, an immersion lens 40 is a solid optical element comprised of a transmitting material with a high refractive index with a hemispherical first surface 42 and a flat second surface 44. The high refractive index of the lens effectively decreases the wavelength of the millimeter wave radiation, allowing a smaller detector to collect the same amount of radiation as would a larger detector in air. In accordance with the teachings of the present invention, a detector array 52 is placed in intimate contact with the second surface 44 of the immersion lens 40 (as shown in FIG. 2). The center of curvature of the immersion lens first surface 42 is at the detector array surface.

The immersion lens 40 significantly complicates the optical design and optical performance in the LWIR because it introduces significant amounts of field curvature. For a compact package (i.e., a long focal length in a small size), some kind of telephoto or Cassegrain-like arrangement is strongly indicated, and the field curvature of a Cassegrain telescope is dominated by the negative reflective power of the secondary mirror.

Unfortunately, the negative reflective power of the Cassegrain secondary has the same sign field curvature as the positive refractive power of the immersion lens, so the field curvature problem is made very much worse. Central to this invention is the use of a negative power refractive Mangin mirror 30 as the Cassegrain secondary mirror, so that the field curvature of the secondary mirror and immersion lens can be made to cancel. With this approach, the optical system as described in the illustrative embodiment can achieve a field of view of 4.6 degrees, and still maintain good LWIR image quality and a compact package.

In addition, any chromatic aberrations from either the Mangin mirror 30 or the immersion lens 40 that might be a problem in the LWIR, can be corrected by a grating or diffraction optic surface. Since such a grating would have a period measured in the tens of microns, it would be operative in the LWIR region and essentially invisible to the MMW radiation, which has a wavelength that is at least 100 times longer.

The shapes of the optical elements are at the designer's discretion. In the preferred embodiment, the optical elements are rotationally symmetric. They may be spherical, conic sections, or rotationally symmetric aspheres. The surfaces in addition to having net positive or negative power by nature of their curvature might also have conic or aspheric departures. One skilled in the art would expect the designer to utilize such devices to specify optimal surfaces for the primary mirror, Mangin mirror, and immersion lens.

The following table provides an optical prescription for an illustrative embodiment of the optical system of the present invention. In the illustrative embodiment, the entrance aperture is 10.0 inches diameter and the focal length is 20.0 inches. The optical speed is F/2.0 and the field of view is 4.6 degrees diameter.

| Surf | Radius | Conic | Asph D | Asph E | Asph F | Asph G | Thickness | Material |
|---|---|---|---|---|---|---|---|---|
| Primary Mirror; Aperture Stop | | | | | | | | |
| 1 | −22.4394 | −1.5789 | −1.5427E−05 | 1.4063E−08 | −1.2127E−09 | 2.1970E−11 | −8.4843 | Refl |
| Mangin Secondary Mirror | | | | | | | | |
| 2 | 6.9331 | −2.1952 | −3.9570E−04 | −2.8492E−04 | −4.6606E−05 | −1.3382E−05 | −0.1914 | ZnSe |
| 3 | 20.1291 | −1.6256 | 5.8227E−04 | −2.4392E−04 | 2.8827E−06 | −1.2616E−05 | 0.1914 | Refl |
| 4 | 6.9331 | −2.1952 | −3.9570E−04 | −2.8492E−04 | −4.6606E−05 | −1.3382E−05 | 3.1614 | Air |
| Immersion Lens | | | | | | | | |
| 5 | 1.5000 | −0.9235 | 2.8222E−02 | 1.6521E−02 | −1.1019E−02 | 6.9485E−03 | 1.5000 | ZnSe |
| Focal Plane Array | | | | | | | | |
| 6 | infinity | n/a | n/a | n/a | n/a | n/a | n/a | n/a |

FIG. 2 is a block diagram of an imaging system 50 for simultaneous imaging of LWIR and MMW radiation designed in accordance with the teachings of the present invention. The system 50 includes the optical assembly 10 of FIG. 1a. A detector array 52 or Focal Plane Array (FPA) is placed in intimate contact with the immersion lens 40 of the optical assembly 10. In the preferred embodiment, the detector array 52 is capable of sensing both LWIR and MMW radiation. Signals from the detector array 52 are processed by a signal processor 54 and output to a display 56. Alternatively, the data may be output to a recording medium or fed to another system such as a tracking system. For instance, the system 50 may also include a gimbal system 56 to direct the optical assembly 10 towards the scene to be imaged. The gimbal mechanism 56 is driven by a controller 58. The output signal from the signal processor 54 could feed the controller 58 to form a closed loop tracking system.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An optical system for imaging electromagnetic energy in first and second wavelength bands, said first wavelength band being in the infrared region of the electromagnetic spectrum and said second wavelength being in the millimeter wave region of the electromagnetic spectrum, said system comprising:

a primary mirror reflective at said first and second wavelength bands;

a Mangin mirror positioned to receive energy reflected from said primary mirror; and an immersion lens for focusing energy received from said Mangin mirror, wherein said Mangin mirror and said immersion lens are designed such that their combined field curvature is approximately zero.

2. The invention of claim 1 wherein said first wavelength band is long wavelength infrared.

3. The invention of claim 1 wherein said primary mirror and said Mangin mirror are arranged in a Cassegrain configuration.

4. The invention of claim 1 wherein said Mangin mirror is comprised of a layer of material transmissive at said first and second wavelength bands with first and second surfaces.

5. The invention of claim 4, wherein said second surface is coated with a material which is reflective at said first and second wavelength bands.

6. The invention of claim 4 wherein said first surface is coated with an anti-reflective coating.

7. The invention of claim 1 wherein said immersion lens has a hemispherical first surface and a flat second surface.

8. The invention of claim 7 wherein said immersion lens is comprised of material transmissive at said first and second wavelength bands.

9. The invention of claim 8 wherein said material has a high index of refraction.

10. The invention of claim 7 wherein said optical system further includes a detector array.

11. The invention of claim 10 wherein said detector array is in intimate contact with the second surface of said immersion lens.

12. The invention of claim 10 wherein the center of curvature of the first surface of said immersion lens is at the surface of said detector array.

13. The invention of claim 10 wherein said detector array is capable of sensing at said first and second wavelength bands.

14. The invention of claim 1 wherein said optical system further includes means for correcting chromatic aberrations.

15. The invention of claim 14 wherein said means for correcting chromatic aberrations is a diffraction grating.

16. A system for simultaneous imaging of infrared and millimeter wave energy comprising:

a primary mirror reflective at infrared and millimeter wavelengths;

a Mangin mirror positioned to receive energy reflected from said primary mirror;

an immersion lens for focusing energy received from said Mangin mirror;

a detector array in intimate contact with said immersion lens; and a signal processor for processing signals from said detector array, wherein said Mangin mirror and said immersion lens are designed such that their combined field curvature is approximately zero.

17. A method for simultaneous imaging of infrared and millimeter wave energy including the steps of:

reflecting said energy onto a Mangin mirror using a primary mirror reflective at infrared and millimeter wavelengths;

correcting for aberrations with said Mangin mirror; and focusing energy from said Mangin mirror onto a focal plane using an immersion lens;

wherein said step of correcting for aberrations includes compensating for field curvature such that the combined field curvature of said Mangin mirror and said immersion lens is approximately zero.

* * * * *